E. W. WOOLLEY.
AIR BRAKE.
APPLICATION FILED JULY 28, 1909.
1,118,994.
Patented Dec. 1, 1914.
3 SHEETS—SHEET 1.
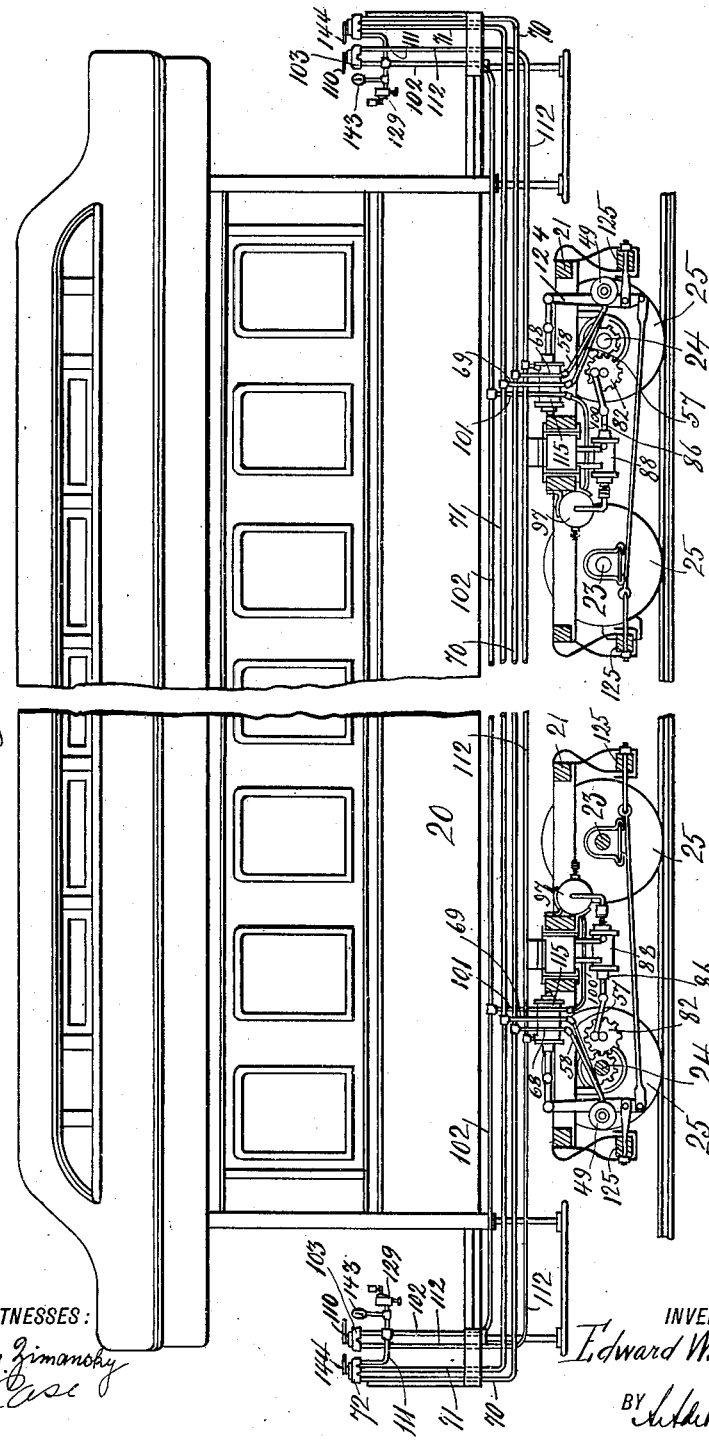
WITNESSES:
INVENTOR
Edward W. Woolley
BY
ATTORNEY E. W. WOOLLEY.
AIR BRAKE.
APPLICATION FILED JULY 28, 1909.
1,118,994.
Patented Dec. 1, 1914.
3 SHEETS—SHEET 2.
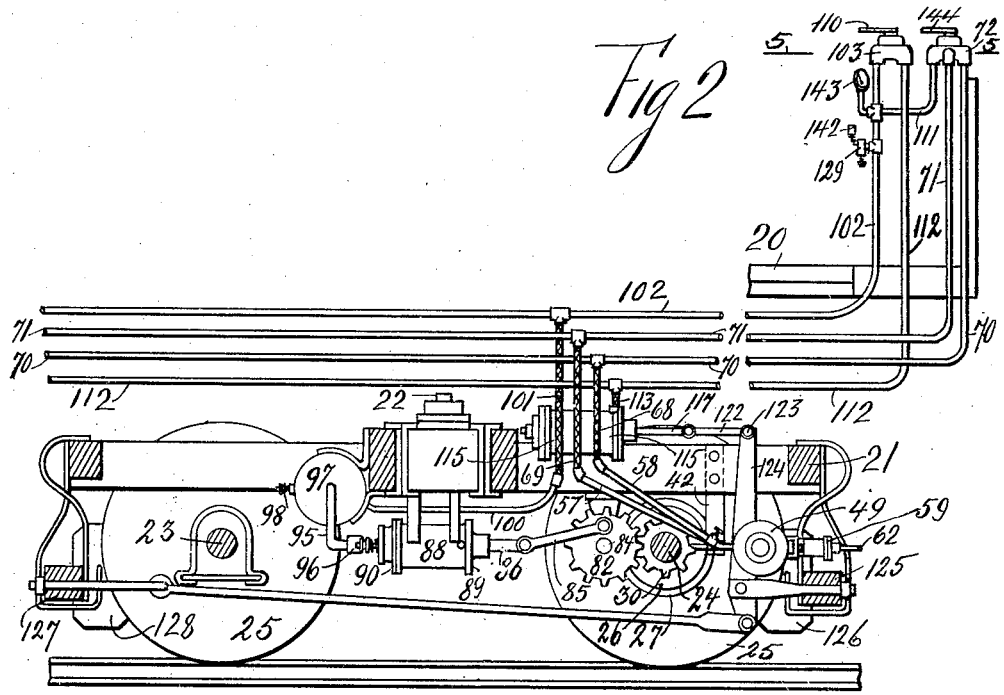
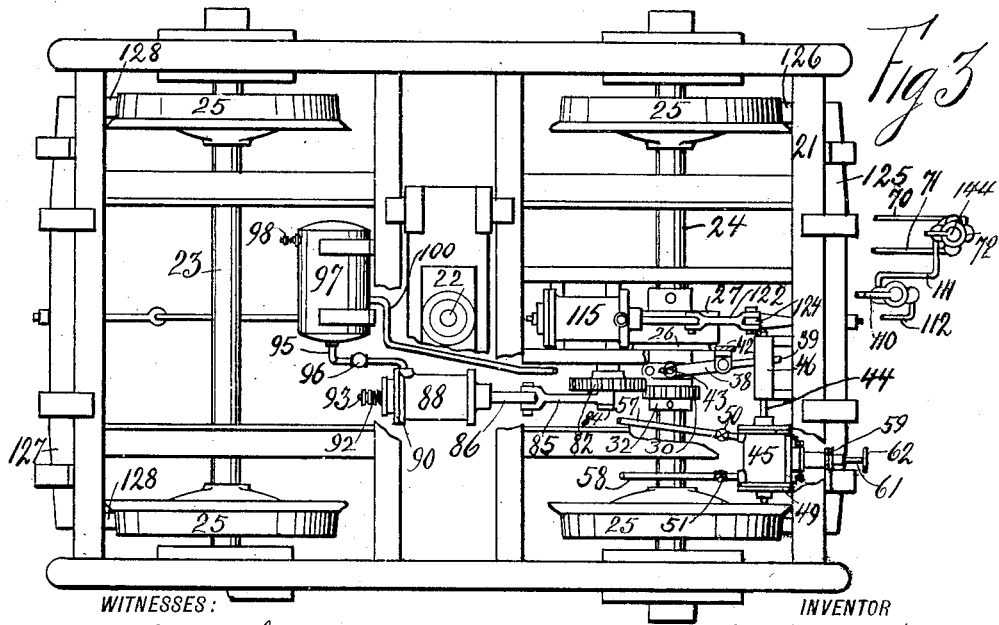

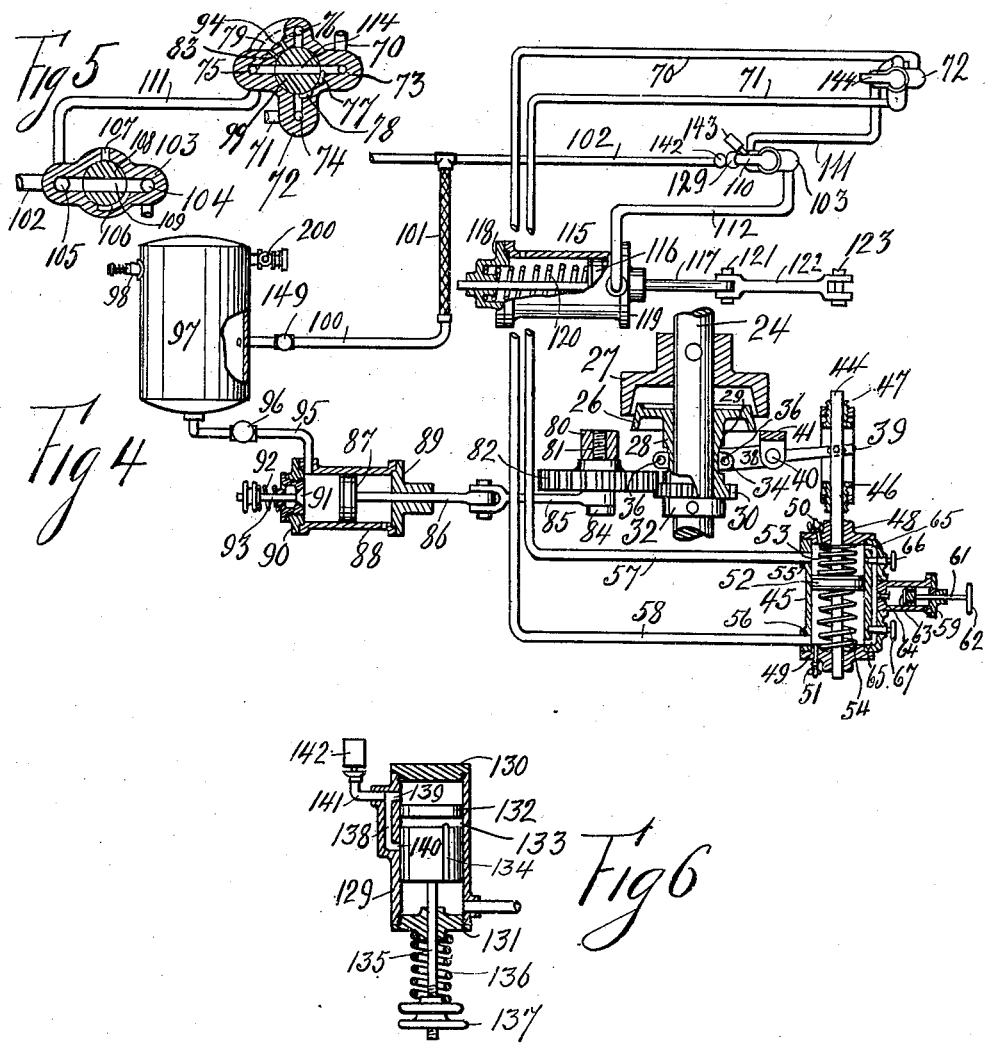

UNITED STATES PATENT OFFICE.

EDWARD W. WOOLLEY, OF JERSEY CITY, NEW JERSEY.

AIR-BRAKE.

1,118,994.  Specification of Letters Patent.  Patented Dec. 1, 1914.

Application filed July 28, 1909. Serial No. 510,124.

*To all whom it may concern:*

Be it known that I, EDWARD W. WOOLLEY, a citizen of the United States, and a resident of Jersey City, in the county of Hudson and State of New Jersey, have invented certain new and useful Improvements in Air-Brakes, of which the following is a specification.

This invention relates to an air brake, and its object is the production of an air brake for a car or other vehicle, which has co-acting therewith means for operating said brake, the said means receiving its energy from a rotating axle of the car or vehicle to which the brake is connected.
In the accompanying drawings, Figure 1 represents the side elevation of a car with the trucks thereof in section and the invention incorporated therewith. Fig. 2 shows an enlarged view of a portion of Fig. 1, Fig. 3 is a partial top plan view of Fig. 2, Fig. 4 represents a partial top plan view of the elements of the invention, Fig. 5 shows an enlarged section of Fig. 2 on the line 5, 5, Fig. 6 is a vertical axial section through the signal cylinder and its appurtenances.

A car is represented with the body 20 pivoted to a pair of four wheel trucks 21, by means of king bolts 22 in the usual way. Axles 23 and driving axles 24 on each truck carry wheels 25, and as the appurtenances of the invention connected with each truck are the same, the description of those connected with one of the trucks only will be described in detail.
The axle 24 carries a friction clutch comprising the male member 26, and the female member 27 that is fastened to said axle. The male member is rotative and slidably supported on the axle 24 and has formed therewith the sleeve 28, having the groove 29 in about its central portion and the pinion 30 at one end thereof. A stop collar 32 is fastened to the axle 24 to control the lateral movements of the said male member. A collar 34 with a pair of elongated diametrically opposite openings like 35 is in engagement with the groove 29, which latter is somewhat wider than the width of the collar. It will be noted that the said collar is made in halves connected by the bolts 36, and that the members of the clutch with their appurtenances can be made each in two halves so as to be easily connected up in place.
A lever with the arms 38 and 39 is pivoted on a pivot 40 supported in a journal bracket 41, that is carried on a support 42 fastened to the frame of the truck. The arm 38 has extending therefrom the pins 43 that engage the openings 35, and the arm 39 is pinned to the piston rod 44 of the clutch cylinder 45, by virtue of which the male member 26 of the clutch is controlled. A guide bracket 46 with adjustable sleeves 47 fastened to the truck, guides one end of the piston rod 44, the other end of which is guided in the cylinder heads 48 and 49 of the cylinder 45. A piston 52 is fastened to the piston rod 44 and springs 53, 54, extend between said piston and the cylinder heads 48 and 49. Openings 55, 56 are formed adjacent to the ends of the cylinder 45 from which extends respectively the piping 57 and 58. A stop cock 50 is fitted in the cylinder head 48 and a stop cock 51 is fitted in the cylinder head 49.

A hand pump 59 having the piston rod 61 with the handle 62, piston valve 63 and discharge valve 64 are connected with the clutch cylinder 45 by means of the ports 65, having the stop cocks 66 and 67. The office of the hand pump 59 is to pump compressed air into either end of the cylinder 45, to throw the male member 26 of the clutch into or out of engagement with its accompanying female member 27, before there is any charge of air in the reservoir to be described. Flexible tubing 68, 69 connect the piping 57 and 58 respectively to the piping 70 and 71, which latter extends lengthwise from one end of the car to the other.

A four-way cock with the body 72 has formed therewith four ports 73, 74, 75 and 76. An annular port 77 is formed with the port 73, and an annular port 78 is formed with the port 74. A port 79 in the body of said cock 72 connects the port 75 with the port 76. Outlet ports 83 and 94 are also formed in the body of the cock 72 opposite the annular ports 77 and 78 respectively. A rotative plug 99 with the port 114 and handle 144 is located in the cock 72.

A bracket 80 extends from the truck 21 and carries a journal pin 81, on which latter is journaled a spur gear 82, the teeth of which mesh with the teeth of the pinion 30. A crank pin 84 extends from the gear 82 and supports one end of the connecting rod 85, the other end of which latter is pinned to the piston rod 86 carrying the piston 87, of the compressor 88 with the cylinder heads 89 and 90. An inlet valve 91 is carried on the cylinder head 90 of the compressor and has the spring 92 around its valve spindle 93, the tension of which tends to close the valve. Piping 95 with the check valve 96 conducts the compressed air from the compressor 88 to the reservoir 97, which latter is fitted with the safety valve 98.

From the reservoir 97 extends the piping 100 with check valve 149 and flexible tubing 101, that in turn connects with the piping 102, extending to both ends of the car and connected with the three-way cock having the body 103. The said cock has formed in its body the ports 104 and 105, the latter connected with piping 102. An annular port 106 connects with the port 104 and an outlet 107 is formed in the body of the cock 103. A plug 108 with the port 109 and handle 110 fits in the body of the said cock 103. From the pipe 102 extends the piping 111 which leads to the port 75 of the four-way cock having the body 72. From the port 104 of the three-way cock having the body 103 leads the piping 112 with the flexible tubing 113 that connects with one end of the brake cylinder 115 supported on the truck 21. A piston 116 in the brake cylinder 115 has connected thereto the piston rod 117 that extends through both cylinder heads 118 and 119 thereof, and a spring 120 around the piston rod 117 bears between the piston 116 and the cylinder head 118. The rod 117 by means of the pin 121 is pinned to the link 122, and the latter by means of the pin 123 is pinned to the brake lever 124. The latter is connected to the brake beam 125 carrying the brake shoes 126 in the ordinary way. The brake beam connections maintain the brake shoes 126 from the tires of the truck wheels, unless the piston 116 forces them in contact therewith. An accompanying brake beam 127 with brake shoes 128 is connected up with the truck in the ordinary way.

To the piping 102 at each end of the car is connected a signal cylinder 129 having the cylinder heads 130 and 131. A piston 132 in the cylinder has formed therewith the circumferential port 133 on the surface thereof and the longitudinal port 134 which connects therewith. A piston rod 135 extends from the piston 132 through the cylinder head 131 and around which is located the spring 136 which bears between the head 131 and the knurled nut 137 to maintain the piston in its normal position. In the wall of the cylinder 129 is formed a port 138, with the ends 139 and 140, that can register with the circumferential port 133. The port 138 is connected with the piping 141 that leads to the whistle 142. The function of the whistle is to apprise the operator or motorman when the pressure in the reservoir 97 is above or below a predetermined range of pressure. If the pressure rises too high the piston 132 rises in the cylinder 129, the port 133 registers with the end 139 of the port 138, and the air flowing through the ports 134, 133 and end 139 will enter the piping 141 and blow the whistle. Should the pressure fall too low the port 133 registers with the end 140 of the port 138 and the air then in a similar manner blows the said whistle. A gage 143 is also attached to each end of the piping 102 to apprise the operator of the pressure within the reservoir 97.

To use the invention and referring particularly to Figs. 1 to 6, and should there be no charge of compressed air in the reservoir 97, and the members of the clutch being unlocked, the operator closes the stop cocks 50 and 67 and opens the stop cocks 51 and 66 to pump sufficient air in the cylinder 45, by means of the hand pump 59 to move the piston 52, and with it the male member 26 of the clutch to lock it with its accompanying female member 27, after which the stop cocks 51 and 66 are closed. The motor, not shown, now starts the car and the driving axle 24 rotating, the compressor 88 pumps compressed air into the reservoir 97, and the apparatus is ready to control the brakes of the car, which the motorman or operator has completely under his control by means of the cocks with the bodies 72 and 103. By moving the handle 110 of the cock with body 103, so that the port 109 registers with ports 104 and 105, compressed air is led from the reservoir 97 by means of the piping 100, 102, 112 and 113, to the brake cylinder 115 to set the brakes on the truck wheels 25. The amount of pressure between the brake shoes 126 and 128 and said brake wheels 25 is controlled by the handle 110, which regulates the port opening through the cock. When the brake shoes are to be released, the air pressure in the brake cylinder 115 and in the piping 112 is released by turning the handle 110 of the cock, so that the port 109 registers with the annular port 106 and outlet 107. Then the tension of the spring 120 will move the piston 116 to release the brakes. While the compressor is being operated by virtue of the members of the clutch having been engaged with each other by the action of the hand pump 59, compressed air flows from the piping 102 into the piping 111 and through the latter to the four-way cock with the body 72.

The handle 144 is located at right angles to the position shown in Fig. 4, so that compressed air flows from the port 75 to the port 76 by way of the port 79, and from the latter through the port 114 to the port 74. The air is thus forced from the piping 111 to the piping 71 by virtue of which the requisite pressure is maintained in the clutch cylinder 45 between the head 48 and the piston 52 thereof, to keep the members 26 and 27 of the clutch locked. When the pressure in the reservoir 97 has risen to its maximum pressure, the operator detaches the member 26 from the member 27 of the clutch. This he accomplishes by moving the handle 144 of the four-way cock 72 so that the port 114 of the plug 99 registers with the outlet port 94 and the annular port 78, when the air will be released from the clutch cylinder 45 between its piston 52 and its head 48, by escaping through the piping 57 and 71 and the ports 114 and 94. To complete the separation of the members of the clutch, compressed air is brought between the piston 52 and the cylinder head 49. This is accomplished by locating the plug 99 as shown in Fig. 5 when air will flow from the piping 111 to the port 75, then through the ports 114 and 73 and the piping 70 and 58 to the cylinder 45. The said male member 26 with its sleeve 28 being free on the axle 24, the pinion 30 will not drive the gear 82, and consequently the piston 87 of the compressor 88 will not reciprocate, and no air will be pumped into the reservoir 97. When the pressure in the reservoir 97 falls below its minimum predetermined pressure, the operator moves the handle 144 so that the port 114 registers with its annular port 77 and the outlet port 83, which will release the pressure from the piping 70 and the clutch cylinder 45 between the piston 52 and the head 49, and pressure is brought between said piston and the head 48 by registering the port 114 with the ports 76 and 74, when the air will flow from the piping 111 to the piping 71 to move the piston 52 to engage the members of the clutch 26 and 27. As already stated the gage 143 indicates the pressure in the reservoir 97, and the whistle 142 warns the operator when said pressure is too high or too low.

It will be noted that the appurtenances of the invention could be attached to a vehicle supported on truck wheels, which have no pivotal connections between them and the body of said vehicle. Also that appurtenances of the invention to actuate the brakes could be omitted from one of the trucks, and the movements of the brakes of one truck could be transmitted to the brakes of the other truck by means of tie rods as is customary with railway cars. The reservoir, or brake-cylinder, or both, may be attached to the body of the car or vehicle.

Having described my invention what I desire to secure by Letters Patent and claim is:

1. The combination of a compressor, a conduit extending from the compressor, a cock connected to said conduit, a conduit leading from said cock, a brake cylinder connected to the latter conduit, a third conduit in connection with said cock, a second cock connected with the third conduit, a pair of conduits extending from the second cock, a clutch cylinder connected with the said pair of conduits, a clutch connected with the clutch cylinder, a driving element for the clutch and a connection between the clutch and said compressor.

2. In a vehicle the combination of a body, a truck pivotally connected to said body, a driving axle for the truck, a clutch connected up with said axle, a clutch cylinder carried by the truck, connections between the clutch and clutch cylinder, a compressor carried by the truck, connections between the clutch and the compressor, a reservoir for the vehicle, a conduit connecting the reservoir and the compressor, a three-way cock on the body of the vehicle, a conduit connecting the three-way cock and the reservoir, a brake cylinder carried by the truck, a conduit connecting the three-way cock and the brake cylinder, a brake for the truck, connections between the brake and the brake cylinder, a four-way cock on the body of the vehicle, means to connect the four-way cock with the reservoir, a conduit connecting the four-way cock with one end of the clutch cylinder, and a conduit connecting the four-way cock with the other end of the clutch cylinder.

3. In a vehicle the combination of a body, a truck pivotally connected to said body, a driving axle for the truck, a clutch connected up with said axle, a clutch cylinder carried by the truck, connections between the clutch and clutch cylinder, a compressor carried by the truck, connections between the clutch and the compressor, a reservoir for the vehicle, a conduit connecting the reservoir and the compressor, a three-way cock on the body of the vehicle, a conduit connecting the three-way cock and the reservoir, a brake cylinder carried by the truck, a conduit connecting the three-way cock and the brake cylinder, a brake for the truck, connections between the brake and the brake cylinder, a four-way cock on the body of the vehicle, means to connect the four-way cock with the reservoir, a conduit connecting the four-way cock with one end of the clutch cylinder, a conduit connecting the four-way cock with the other end of the clutch cylinder, and a hand pump for the clutch cylinder to pump into either end of the same.

4. In a vehicle the combination of a body, a truck pivotally connected to said body, a driving axle for the truck, a clutch connected up with said axle, a clutch cylinder carried by the truck, connections between the clutch and clutch cylinder, a compressor carried by the truck, connections between the clutch and the compressor, a reservoir for the vehicle, a conduit connecting the reservoir and the compressor, a three-way cock on the vehicle, a flexible connection connecting the said cock and reservoir, a brake cylinder on the truck, a flexible connection between the three-way cock and the brake cylinder, a brake for the truck, connections between the brake and the brake cylinder, a four-way cock on the vehicle, a conduit connecting the four-way cock with the flexible connection between the first three-way cock and the reservoir, a flexible connection between the four-way cock and one end of the clutch cylinder, and a second flexible connection between the four-way cock and the other end of the clutch cylinder.

5. In a vehicle the combination of a body, a pair of trucks pivotally connected to said body, a driving axle on each truck, a clutch connected up with each driving axle, a compressor on each truck connected with one of the members of the clutch on its truck, a reservoir on each truck, a conduit on each truck connecting the compressor and reservoir thereon, a conduit on the vehicle connecting the reservoirs, a three-way cock on the ends of said conduit, a conduit extending from each of said cocks, a brake cylinder on each truck, each of the latter connected with one of the conduits leading from the three-way cock, a four-way cock on each end of the car, a connection between each of the said four-way cocks and both the reservoirs, a pair of conduits extending from each of the four-way cocks and a clutch cylinder connected with each of said pair of conduits.

6. In a vehicle the combination of an axle, wheels for the axle, a clutch connected up with the axle, a clutch cylinder on the vehicle and connected with said clutch, a compressor on the vehicle, connections between the compressor and said clutch, a reservoir on the vehicle, a conduit connecting the reservoir and the compressor, a cock on the vehicle, a conduit connecting the reservoir and the cock, a brake cylinder on the vehicle, a conduit connecting the cock and the brake cylinder, a brake for the wheels, connections between the brake and the brake cylinder, a second cock on the vehicle, means to connect the second cock with the reservoir, a conduit connecting the second cock with one end of the clutch cylinder, and a conduit connecting the second cock with the other end of the clutch cylinder.

7. In a vehicle the combination of an axle, wheels for the axle, a clutch connected up with the axle, a clutch cylinder on the vehicle and connected with said clutch, a compressor on the vehicle, connections between the compressor and said clutch, a reservoir on the vehicle, a conduit connecting the reservoir and the compressor, a cock on the vehicle, a conduit connecting the reservoir and the cock, a brake cylinder on the vehicle, a conduit connecting the cock and the brake cylinder, a brake for the wheels, connections between the brake and the brake cylinder, a second cock on the vehicle, means to connect the second cock with the reservoir, a conduit connecting the second cock with one end of the clutch cylinder, a conduit connecting the second cock with the other end of the clutch cylinder, and a hand pump for the clutch cylinder to pump into either end of the same.

8. The combination of a reservoir and a cylinder, a three-way cock interposed between said elements to charge said cylinder with a fluid from the reservoir and also to discharge the said fluid from the cylinder, a four-way cock connected with said reservoir, a second cylinder with a piston therein connected with the four-way cock, a plug having a port in the four-way cock, ports in the cock coacting with the port in said plug to alternately charge the latter cylinder on either side of its piston with a fluid and discharge a fluid from the other side of said piston.

Signed at Jersey City in the county of Hudson and State of New Jersey this 26th day of July A. D. 1909.

EDWARD W. WOOLLEY. [L. S.]

Witnesses:
 ISABEL FAWCETT,
 IDA A. WOOLLEY.

Copies of this patent may be obtained for five cents each, by addressing the "Commissioner of Patents, Washington, D. C."